Oct. 14, 1924.

C. M. WILLIAMS
GEOGRAPHICAL GLOBE 1,511,487

Filed March 29, 1922    2 Sheets-Sheet 1

Inventor:
Charles M. Williams,
by Anton Hartnett
his Atty.

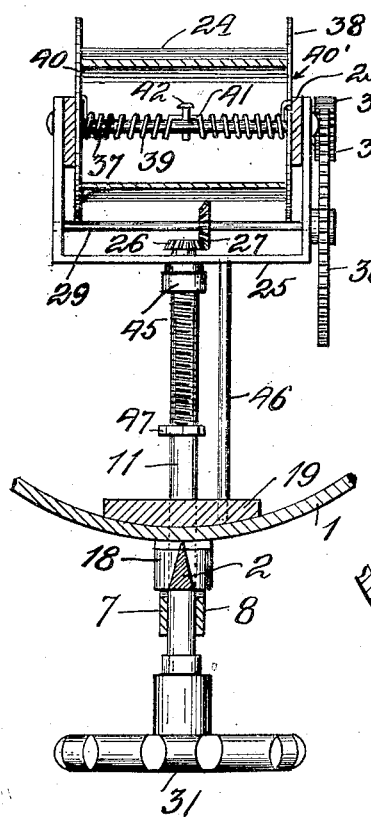

Patented Oct. 14, 1924.

1,511,487

UNITED STATES PATENT OFFICE.

CHARLES M. WILLIAMS, OF LOS ANGELES, CALIFORNIA.

GEOGRAPHICAL GLOBE.

Application filed March 29, 1922. Serial No. 547,638.

*To all whom it may concern:*

Be it known that I, CHARLES M. WILLIAMS, a citizen of the United States, residing at Los Angeles, county of Los Angeles, and State of California, have invented a certain new and useful Geographical Globe, of which the following is a specification.

This invention relates to a terrestrial or celestial globe or sphere and has particular reference to a means for use in association with a spherical representation of the earth or of a celestial body, provided with longitudinal and latitudinal divisions, in readily ascertaining or fixing places, or other data denoted on a globe, with the especial object in view of enlivening interest in the understanding of the globe and its movement, encouraging education of its geography and facilitating the accurate and quick location of its records.

The invention consists of an index, guide or key, in the form of a tape, ribbon, or other means on which may be inscribed, printed or otherwise provided, names or designations, points or marks, as of cities, States, countries, islands, bodies of water or any other geographical or topographical information or instruction, with the longitude and latitude thereof, in combination with a globe.

It further consists of a key, guide or index associated with a revoluble globe and means for actuating the key, guide or index, to present to view any name or designation the location of which is desired on the globe.

The key, guide or index, while herein shown to contain the names of places with the numerals indicative of the longitude and latitude, may also be provided with suitable legends of historical or scientific interest.

These and other objects are accomplished by the device shown in preferred form in the accompanying drawings, in which Fig. 1 is a vertical sectional view of a globe showing the guide or index as applied and the actuating mechanism therefor.

Fig. 2 is a staggered section on line 2—2, Fig. 1, showing the actuating mechanism, and tension means for one of the spools or drums.

Fig. 3 is a plan view of the index and the operating means therefor, and

Fig. 4 is a fragmentary view of the globe illustrating a sight aperture therein and the tape provided with the index and the longitude and latitude of the names on the index.

Figure 1:
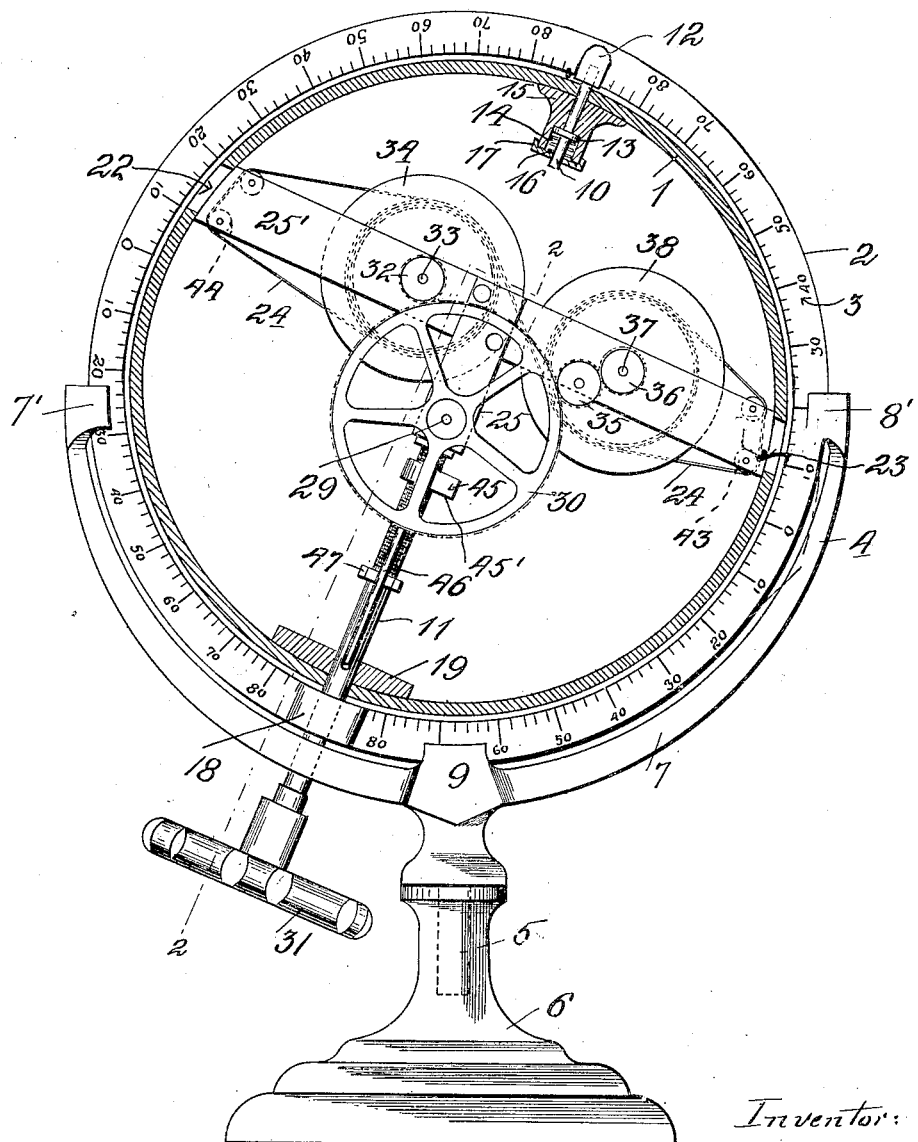

The invention comprises specifically a hollow sphere or globe 1, mounted for axial rotation in an annulus or ring 2, provided with graduations 3, indicating the degrees of latitude that are to co-operate with the longitudinal graduations, not shown, but usually provided on a globe, in ascertaining the position of a place or point. The ring or annulus 2 is tapering in cross-section, as seen in Fig. 2 in order to centralize the point of vision on the globe, and is mounted for partial rotation in an arcuate support 4, which is provided with a stem 5, fitting in a suitable base 6, upon and relatively to which said arcuate support 4, and the annulus 2 and the globe 1, carried thereby, are freely revoluble. The said support 4, by preference, consists of two spaced arcuate members 7 and 8, conjoined at the ends and in the center thereof and provided with inwardly projecting extensions 7', 8' and 9, providing grooves in which the annulus or ring 2 is guided and movable by means described hereinafter, to facilitate the reading of the records of the lower hemisphere of the globe 1.

The globe 1 is axially rotatable within said annulus 2 on a pivot 10, and a bar 11, hereafter more specifically detailed. The pivot 10 extends through the wall of the globe and into a bearing 12, on the ring or annulus 2. In order to facilitate disengagement of the pivot 10 from its bearing 12, the pivot 10 is provided with a collar 13, which is operatively located in a recess 14, formed in a block 15, secured to the inside of the globe. This collar 13, of the pivot 10 is under the tension of a spring 16, which is held in place by a cap or other means 17, suitably attached to the block 15 and which spring insures engagement of the pivot with the bearing 12. The pivot 10 extends through the cap 17 and affords a hold or purchase for the fingers or other members when withdrawal of the pivot from the bearing is desired.

The diametrically opposite pivot is formed, as stated, by a bar 11. This bar extends between the spaced arcuate members 7 and 8 of the support 4, through a boss 18 formed on the ring 2, through the wall of the globe and through a reinforcing member 19, fastened in any suitable manner to the globe.

The globe, which may represent a terrestrial or celestial sphere, is inscribed or otherwise provided with delineations pertaining to the nature of the body represented. For the purposes of this description and disclosure, the globe is geographically delineated and inscribed with names and also with the circles of longitude and latitude, though the latter may be indicated by the graduations 3, on the annulus 2. These graduations on the annulus may be of any arrangement or order that will facilitate the use of them in locating a position or place on the globe. The arrangement of such graduations shown in Fig. 1, is merely indicative of one form that may be used. Obviously the records 20 on the index, guide or key, must be in proper correspondence with the graduations 3 of the annulus 2, and hence a place or point may be quickly located by rotating the globe to bring the proper longitude of the place desired located at the graduated annulus 2 and referring to the graduations thereon.

The globe 1 is preferably provided with two apertures 22 and 23, through which the indices on the tape 24, may be read, and the movement of such tape or ribbon to expose to view any place or point, whether on the globe or not, is accomplished by the following means, shown more in detail in Fig. 2.

The bar 11 extends through a yoke 25, depending from a frame 25′ secured in any suitable manner within the globe 1. On the end of said bar is fixedly secured a bevel pinion 26, meshing with a bevel gear 27, on a shaft 29, journaled in said yoke 25. On one end of said shaft 29 is mounted a gear 30, which is arranged to be rotated in either direction by said bar 11, through the medium of a hand wheel 31, provided on the other end thereof. This gear 30, meshes with a smaller gear 32 provided on the shaft 33 of a drum or spool 34, which is journaled in the frame 25′, and upon which is wound the tape or ribbon 24, containing the index, guide or key to the globe. On the frame 25′ is also journaled an idler gear 35, meshing with said gear 30 and with a gear 36 on a shaft 37, journaled in said frame and upon which shaft 37, as hereafter explained, is yieldingly mounted a drum 38, upon which another portion of the tape or ribbon is wound. By the arrangement as described, the drums 34 and 38 are positively operated in opposite directions whereby the tape or ribbon 24 may be moved to expose the indices thereon at either one or the other aperture 22 or 23.

The drum 38 is yieldingly connected to the shaft 37, upon which it is mounted, by a spring 39, coiled about the shaft in substantially the manner shown, the ends of said spring being anchored in the side plates 40 and 40′ of the drum 38. Centrally of its length, the spring 39 is preferably formed with a loop 41 for engagement with a pin 42 which is extended through the shaft 37, whereby there is a constant tendency of movement of the drum 38 relative to the shaft 37. Thereby the tape 24 is maintained under tension thus avoiding breakage and strain incident on the winding of the tape from one drum to another and vice versa.

In each end of the frame 25′ is journaled a plurality of rollers 43 and 44, over which runs the tape or ribbon 24, which after being wound upon the rollers in substantially the manner shown, is always under tension and may readily be operated in either direction, as may be desired.

The index, key or guide may be of any arrangement, form or order and may contain other information or data than merely the names on the globe with the longitude and latitude thereof.

I have herein described and shown an index containing strip or ribbon associated with a globe in such manner that it constitutes a part of the globe. This arrangement, however is merely for convenience and any other association of the index with the globe, or part thereof, whereby the index may be readily consulted and operated, is included hereunder.

In order to prevent the total unwinding of the tape from the spools 34 and 38, a stop member 45 is provided. This stop member 45 is threadedly mounted on a bar 11, and is formed with an extension 45′, arranged to engage a bar or rod 46, mounted in close proximity to the bar 11, whereby, when the bar is turned in either direction by the hand wheel 31, the stop member 45 travels upwardly or downwardly, and engaging either the underside of the yoke 24 or a nut 47, prevents further turning of the bar 11.

It will be observed that the outside of the annulus 2 is concentric, in order to cause the same to move more readily in the bearings, but the inside thereof is elliptic or eccentric but concentric with the sphere enclosed by said annulus. In this manner the distance between the annulus and the globe is the same throughout its periphery.

What I claim is:

1. A globe mounted for axial rotation in combination with a register contained within the globe and of places on said globe, said register furnished with means for ascertaining location of said places on said globe.

2. A globe mounted for axial rotation and a register within said globe and containing longitude and latitude legends of places on the globe.

3. In combination with a globe mounted for axial rotation, an index therein containing names and the longitude and latitude thereof, and means for successively presenting the names on the index.

4. A globe mounted for axial rotation and having means co-operating with the globe in finding longitude and latitude thereof, and an index carried by said globe and containing a list of places with the longitude and latitude thereof by which their location on the globe may be ascertained.

5. A geographical globe, a graduated member co-operating with said globe in finding longitude and latitude and in which said globe is axially rotatable, said globe provided with a list of places with their longitude and latitude indication by which their location on the globe may be determined.

6. A geographical globe, a member graduated to indicate degrees of latitude and in which said globe is axially rotatable, and an index in and movable with respect to said globe and containing the names of places with the longitude and latitude thereof.

7. A geographical globe, a revoluble member graduated to indicate degrees of latitude, said member being shaped in cross-section to centralize the vision on the globe and said globe being supported and axially rotatable in said member, and an index associated with said globe and containing the names of places with the longitude and latitude thereof.

8. A geographical globe, a cross-sectionally inwardly tapered member in which said globe is axially rotatable, said member provided on the inclined faces thereof with graduations indicating degrees of latitude, an index associated with said globe containing the names of places with the longitude and latitude thereof, and means for operating said index relatively to said globe.

9. A globe having a plurality of apertures, a revoluble member graduated to indicate degrees of latitude, said globe being axially rotatable within said member, an index associated with said globe and containing the names of places and points with means for facilitating location of same on the globe, and means for operating said index relatively to said apertures.

10. A geographical globe having a plurality of apertures, a revoluble member graduated to indicate degrees of latitude, said member being tapered in cross-section and said globe being axially rotatable within said member, an index associated with said globe and containing means for locating places and points thereon, means to operate said index relatively to said apertures, and means to maintain a tension on said index.

11. A geographical globe, a revoluble member supporting said globe for axial rotation, said member being inwardly tapered and provided on the inclined faces thereof with graduations indicative of latitude.

12. A geographical globe, a revoluble member supporting said globe for axial rotation, and said member being inwardly tapered and provided on the inclined faces thereof with graduations indicative of latitude, a register of names associated with said globe, said register furnished with latitude and longitude indications.

13. A geographical globe, an inwardly tapering member in which said globe is axially rotatable, said member provided with graduations on the inclined faces thereof to indicate latitude, and an index associated with said globe and containing a register of places on said globe with longitude and latitude indication of such places.

14. A geographical globe, an inwardly tapered member in which said globe is axially rotatable, said member provided with graduations on the inclined faces thereof to indicate latitude, and an index associated with said globe and containing a register of places on said globe, with longitude and latitude indications of said places, and means for moving said index to expose the data on said register.

15. A globe, and an index therefor wholly contained and operable within said globe.

16. A globe having apertures, and an index wholly contained and operable within said globe.

In testimony whereof I have set my hand.

CHARLES M. WILLIAMS.